United States Patent
Lazaar et al.

(10) Patent No.: US 6,205,402 B1
(45) Date of Patent: Mar. 20, 2001

(54) METHOD FOR AUTOMATICALLY FORMING A MODEL SIMULATING THE STRATIGRAPHIC STRUCTURE OF AN UNDERGROUND ZONE

(75) Inventors: Saiida Lazaar, Delacroix (BE); Dominique Guerillot, Beaujon (FR)

(73) Assignee: Institut Francais du Petrole, Rueil-Malmaison cedex (FR)

(*) Notice: Subject to any disclaimer, the term of this patent is extended or adjusted under 35 U.S.C. 154(b) by 0 days.

(21) Appl. No.: 09/271,882

(22) Filed: Mar. 18, 1999

(30) Foreign Application Priority Data

Mar. 20, 1998 (FR) .................................. 98 04084

(51) Int. Cl.$^7$ ................................................ G06F 19/00
(52) U.S. Cl. .................................. 702/2; 702/14
(58) Field of Search .................. 702/2, 14; 324/339; 367/73; 703/2

(56) References Cited

U.S. PATENT DOCUMENTS

| | | | |
|---|---|---|---|
| 4,964,099 | * | 10/1990 | Carron .................................... 367/73 |
| 5,081,612 | * | 1/1992 | Scott et al. .............................. 367/38 |
| 5,844,799 | | 12/1998 | Joseph et al. ............................ 702/2 |

FOREIGN PATENT DOCUMENTS

| | | | |
|---|---|---|---|
| 0297737 | * | 4/1989 | (EP) ................................. G01V/1/28 |
| 2744224 | | 8/1997 | (FR) ................................. G01V/1/28 |
| 2338804 | * | 4/1989 | (GB) ................................. G01V/1/28 |

OTHER PUBLICATIONS

"Stratigraphic Simulation of Sedimentary Basins: Concepts and Calibration", by D. T. Lawrence et al appearing in AAPG Bulletin—The American Association of Petroleum Geolists Bulletin, vol. 74, No. 3, Mar. 1990, pp. 273–295.

"Application of a Dual–Lithology, Depth–Dependent Diffusion Equation in Stratigraphic Simulation" by J. C. Riveneas appearing in Basin Research, vol. 4, 1992, pp. 133–146.

"Inversion of Acoustic Data Using a Combination of Genetic Algorithms and the Gauss–Newton Approach", by P Gerstroft, appearing in Journal of the Acoustical Society of America, vol. 97, No. 4, Apr. 1, 1995, pp. 2181–2190.

"Gradients Method Constrained by Geological Bodies for History Matching" by D. Rahon et al, appearing in Proceedings of the 1996 SPE Annual Technial Conference and Exhibition, Part Omega; Denver, CO, USA, Oct. 6–9, 1996, vol. Omega, 1996, pp. 841–850.

* cited by examiner

Primary Examiner—Christine K. Oda
Assistant Examiner—Victor J. Taylor
(74) Attorney, Agent, or Firm—Antonelli, Terry, Stout & Kraus, LLP

(57) ABSTRACT

A method for automatic modelling of the stratigraphic structure of an underground zone with fast adjustment of the parameters of the model with observed or measured data is disclosed. The method comprises a) determining, by measurement or observation, a series of quantities (such as sedimentary deposit heights for example) representative of the stratigraphic structure of the zone at various points, b) implementing a (for example diffusive type) direct initial model depending on a set of parameters representative of the geologic formation process of the zone, c) determining, by means of the initial model, the values taken by the quantities at the various measurement or observation points, d) calculating, by means of the direct model, the gradients (by the analytic or finite-difference type method according to circumstances) of each quantity in relation to the parameters to be adjusted, and e) optimizing the model by minimizing by successive iterations the criterion function (preferably according to a quasi-Newtonian algorithm) until a sufficient difference reduction is obtained, by calculating the sensitivity of the direct model to the parameters to be adjusted, so as to produce a stratigraphic representation of the underground zone.

13 Claims, 9 Drawing Sheets

FIG.4

1- INPUT OF THE PARAMETER TO BE ADJUSTED :

$$p \in \{K, q\} \cup \{K, s_1, s\}.$$

2- SOLVE EQUATION (6) TO OBTAIN $h$ :

USE THE « DIFFUSION CODE » CODE.

3- LET $\dfrac{\partial(6)}{\partial p} : \dfrac{\partial h}{\partial p}$ BE THE UNKNOWN OF EQUATION $\dfrac{\partial(6)}{\partial p}$.

(TO SOLVE IT, USE THE " DIFFUSION CODE " BY CHANGING THE SECOND MEMBER).

FIG.5

1. INPUT OF $p^0 = (p_0^0, p_1^0, ...)$ ET $h^{ob}$ ?

2. CALCULATE $h^k(.; p^k)$ USING THE ALGORITHM OF THE DIRECT MODEL.

3. ESTIMATION OF THE DIFFERENCE $\Delta h^k = h^{ob} - h$.

4. TEST : SI NORM $\|\Delta h^k\|$ IS SMALL, STOP.

5. ELSE : CALCULATE $Y_i^k = \nabla_{p_i} h^k(p^k)$

USING AN ALGORITHM THAT CALCULATE THE GRADIENT.

($\nabla_{p_i} h^k(p^k)$ IS THE GRADIENT FOR $p_i$ DE $h^k$ AT POINT $p^k$).

6. UPDATE THE PARAMETERS : $p_i^{k+1} = p_i^k + [Y_i^k]^{-1} \Delta h^k$.

LET $p^{k+1} = (..., p_i^{k+1}, ...)$

7. RETURN TO 2. WITH THE NEW SET OF PARAMETERS.

FIG.6 i) SELECT $p^0$ STARTING POINT.

ii) ON l'ITERATION $k$, DETERMINE THE DIRECTION OF DESCENT $d_k = -H_k \cdot \nabla J(p^k)$, BY SEEKING THE DIRECTION FOR WHICH THE SCALAR PRODUCT $\nabla J^\perp(p^k) \cdot d_k < 0$.

DETERMINE $p^{k+1}$ BY CALCULATING THE MINIMUM OF $J(p^k + \theta d_k)$, $\theta \geq 0$: $p^{k+1} = p^k + \theta_k d_k$ WHERE $J(p^k + \theta_k d_k) = Min_\theta J(p^k + \theta d_k)$.

(USE A ONE-DIMENSIONAL OPTIMIZATION METHOD).

PUT $\delta_k = p^{k+1} - p^k$.

CALCULATE $\gamma_k = \nabla J(p^{k+1}) - \nabla J(p^k)$.

DEDUCE $H_{k+1}$ BY MEANS OF FORMULA (20).

iii) LET $k = k + 1$

STOP TEST OR RETURN TO (ii).

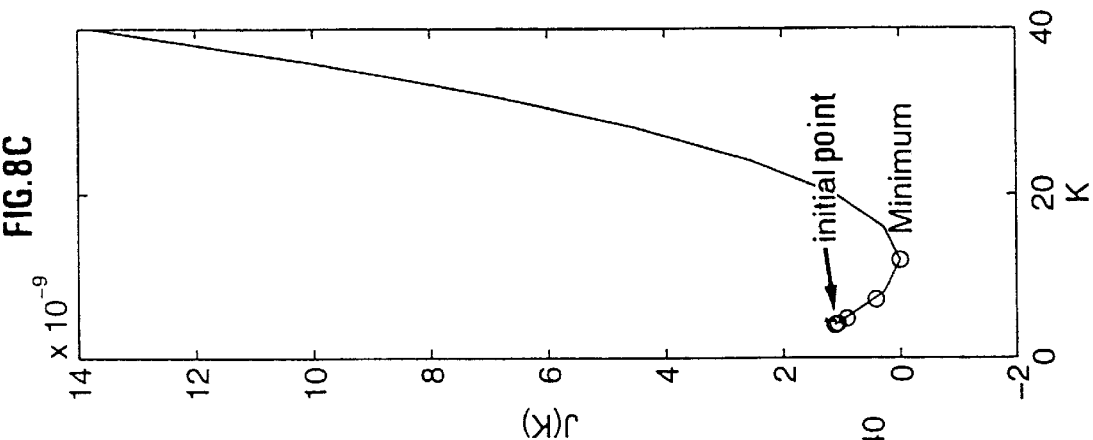
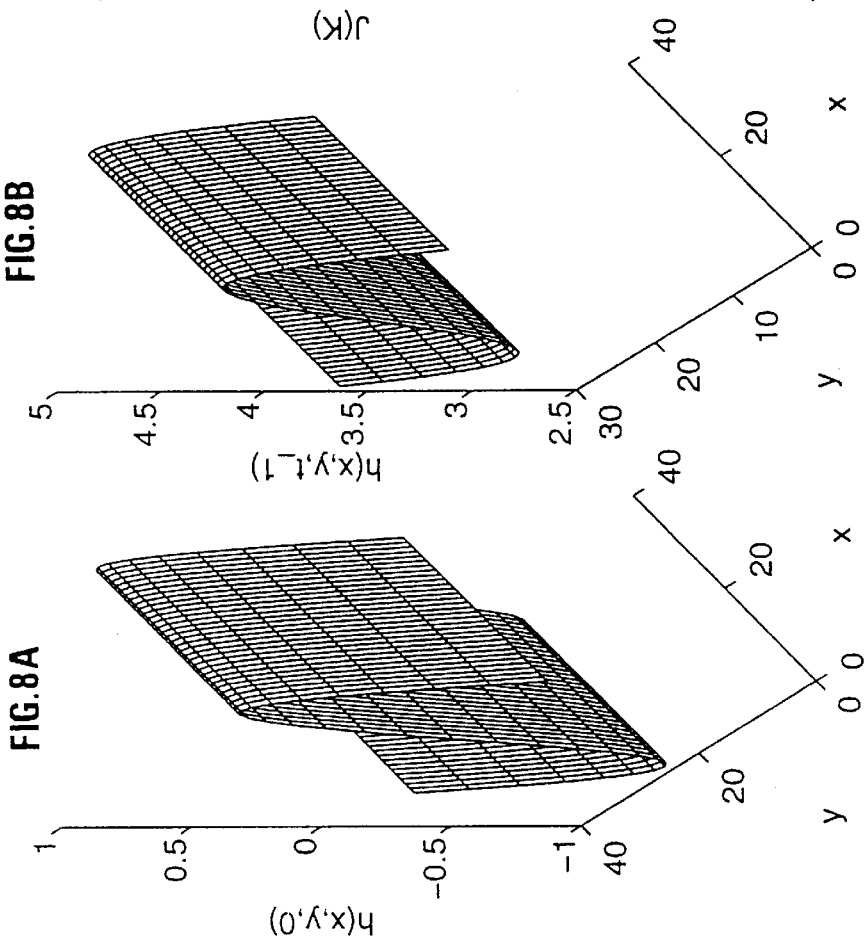

FIG.10

| $(q^0; q^{final})$ | (0., 9.999) | (0., 10.) | (0., 10.) | (0., 9.999) | (0., 9.999) |
|---|---|---|---|---|---|
| $(K_1^0, K_1^{final})$ | (0., 5.610) | (2., 4.932) | (0., 4.997) | (0., 4.996) | (0., 4.996) |
| $(K_2^0, K_2^{final})$ | (0., 1.) | (1., 1.) | (2.5, 2.526) | (25, 2.501) | (30, 2.495) |

FIG.11

| $(q^0; q^{final})$ | (0., 9.999) | (0., 10.) | (0., 10.) | (200., 10.) |
|---|---|---|---|---|
| $(K_1^0, K_1^{final})$ | (0., 4.998) | (0., 5.034) | (0., 5.498) | (200., 4.998) |
| $(K_{2r}^0, K_2^{final})$ | (0., 2.332) | (100., 2.526) | (200., 2.526) | (25, 2.501) |

FIG.12

| $(q^0; q^{final})$ | (0., 9.999) | (0., 10.) | (0., 9.999) | (0., 10.) | (200., 10.) | (200., 10.) |
|---|---|---|---|---|---|---|
| $(K_1^0, K_1^{final})$ | (0., 5.040) | (2., 4.957) | (0., 4.966) | (200., 4.999) | (200., 4.999) | (200., 4.999) |
| $(K_2^0, K_2^{final})$ | (0., 2.846) | (6., 2.909) | (6., 2.941) | (200., 2.993) | (200., 2.993) | (200., 2.993) |

METHOD FOR AUTOMATICALLY FORMING A MODEL SIMULATING THE STRATIGRAPHIC STRUCTURE OF AN UNDERGROUND ZONE

BACKGROUND OF THE INVENTION

1. Field of the Invention

The present invention relates to an optimized method for modelling the stratigraphic structure of an underground zone allowing fast adjustment of the parameters of the model with observed or measured data.

2. Description of the Prior Art

Sedimentary basins evolve over the course of time. They have a variable geometry under the effect of compaction (the pore volume decreases), subsidence (basin bottom deformation) and erosion (removal of part of the upper sediments of the basin). In a marine environment, sediments settle on the bottom and form a sedimentary basin. Estimation of the sediment height and the lithologic contents under the influence of compaction, subsidence and erosion is desirable.

The following notations are used to define all the parameters involved in the definition and the formation of such a sedimentary basin:

$\Omega$ Space studied that represents the sedimentary basin, $\Omega \subset \mathrm{IR}^2$.

N Number of lithologies, $N \geq 1$.

$E_{water}^1$ Water efficiency, (unit: [$\phi$] depending on the lithology l).

$q_1$, l=1, ..., N: Sedimentary flow of the lithology l on the boundary of the space, it depends on time, (unit: $[L^2T^{-1}]$, L is the length and T the time).

$v_1$, l=1, ..., N : Lithology l content, it depends on time, (unit: [$\phi$]).

$Q_L$, l=1, ..., N: Sedimentary flow of the lithology l, (unit: $[L^2T^{-1}]$).

H(x,y,t): Height of the sediment, (unit: [L]).

$V_s$: Velocity of subsidence, (unit: $[LT^{-1}]$).

$\Phi_1$: Porosity, (unit: [$\phi$]).

$K_1(h)$: Diffusion coefficient, also referred to as diffusivity, it depends on the space and time variables, (unit: $[L^2T^{-1}]$).

The series of equations describing the sedimentation process are as follows:

Equation for h: given by a mass conservation law.

Equation for $E_{water}^i$; it corresponds to the efficiency of the water (in transportation of sediments).

Equation connected with the diffusion coefficient $K_i(h)$, it involves bathymetry and allows defining of the diffusion coefficient in relation to three different zones: continental, splash (tidal zone) and marine zone. The value of the diffusion coefficient will thus be defined from the three values K1 ($K_{land}$), K2 ($K_{bathy}$) and K3 ($K_{sea}$) (FIG. 1) whose link between the continental and the marine zone is linear.

Equation connecting the flow Q with the height h of the lithology i: $Q_i = -K_i v_i E_{water}^i \vec\nabla h$, it is given by a flow law similar to Darcy's law.

In order to define the direct model of a basin, it is well-known to couple, for each lithology, transport equations with mass conservation equations so as to define, at each point of the basin, the rate of erosion or of sedimentation and the amount of each lithology.

The sedimentary basin is first represented by $\Omega$, open space of $IR^2$ of boundary $\Gamma = \Gamma_1 U \Gamma_2$, and $h, Q_i$ and $v_i$, i=1, ..., N are to be found such that:

$$\begin{cases} \frac{\partial}{\partial t}(v_i \Phi_i h) + div \vec{Q_i} = g_i \text{ on } \Omega \times [0, T[ \\ \vec{Q_i} = -K_i v_i E_{water}^i \vec\nabla h \\ \sum_{i=1}^{N} v_i = 1 \\ h = h_o \text{ on } \Gamma_1 \times [0, T[ \\ v_i E_{water}^i K_i \vec\nabla h \cdot \vec{n} = f_i \text{ on } \Gamma_2 \times [0, T[ \\ h(x, y, 0) = g(x, y) \text{ on } \Omega, t = 0 \end{cases}$$

Functions $g_i$ can depend on the sedimentary supplies $q_i$ (production of carbonates, etc) or on the accomodation (velocity of subsidence $V_s$, eustasy, compaction), etc. In cases where velocities $V_s$ are known and functions $K_i$ are bounded on $\Omega$ so that, for any i, we have $\alpha_i > 0$ such that $K_i \geq \alpha_i$, h will be solution to the parabolic equation as follows:

$$\frac{\partial}{\partial t}\left(\sum_i v_i \Phi_i h\right) + div\left(\sum_i f_i(h) \vec\nabla h\right) = \sum_{i=1}^{N} g_i \qquad (1)$$

where $(f_i(h) = -K_i v_i E_{water}^i)$.

In the field of geosciences, there are well-known inversion methods allowing constrain of an initial simulation model of an underground zone such as a sedimentary basin, resulting for example from a geostatistical simulation, by data observed or measured in the zone, according to an automatic iterative process.

Several techniques exist for solving inversion problems. A well-known trial-and-error technique consists in applying a genetic type optimization algorithm copied from the process of evolution by natural selection. An example of this technique applied to stratigraphic modelling of sedimentary basins is for example described by:

Bornhotdt S., Optimization using Genetic Algorithms; Proceedings Numerical Experiments in Stratigraphy (NES) 1996.

Implementation of this technique is easy and requires no gradient calculation. However, in certain numerical tests, on account of the random selection of the initial population, several generations and a large population are required to decrease the criterion function, this term designating the least-squares error between observations (reference values) and predictions (calculated values).

Another well-known method consists in using an iterative backward algorithm for parameter adjustment, assuming that the criterion function respects certain forms. A technique of this type, applied to stratigraphic modelling of sedimentary basins, is for example described by:

Lessenger M. et al.: Forward and Inverse Simulation Models of Stratal Architecture and Facies Distribution in Marine Shelf to Coastal Plain Environments. Thesis, Colorado School, November 1993, or by Lessenger M. et al.: Estimating Accuracy and Uncertainty of Stratigraphic Predictions from Inverse Numerical Models; in Proceedings Numerical Experiments in Stratigraphy (NES), 1996.

The Assignee's U.S. Pat. No. 5,844,799 also describes a manual type trial-and-error method that can be used in the case of a geologic parameter adjustment problem in a stratigraphic process, when one has good knowledge of the sedimentary deposit environment.

SUMMARY OF THE INVENTION

The method according to the invention allows automatic modelling of the stratigraphic structure of an underground zone with fast adjustment of parameters of the model with observed or measured data. It comprises determining, by measurement or observation, a series of quantities representative of the stratigraphic structure of the zone at various points, implementing a direct initial model depending on a set of parameters representative of the geologic formation process of the zone, and determining, by means of the initial model, the values taken by the quantities at the different measurement or observation points. The method is characterized in that it further comprises:

calculating, by means of the direct model, the gradients of each quantity in relation to the parameters to be adjusted, and optimizing the model by minimizing, by successive iterations, a criterion function until a sufficient difference reduction is obtained, by calculating the sensitivity of the direct model to the parameters to be adjusted, so as to produce a stratigraphic representation of the underground zone.

The method according to the invention finds applications in sedimentary basin modelling notably in order to help reservoir engineers to better locate underground hydrocarbon reservoirs.

The method comprises for example using a diffusive type model.

If the direct model selected is derivable in relation to the parameters, the method comprises for example using an analytic type gradient.

The method can also comprise using finite-difference gradients.

The method can also comprise using for example a quasi-Newtonian algorithm to minimize the criterion function.

The method according to the invention allows obtaining fast convergence of the initially selected stratigraphic model with the measurements and observations of the sedimentary heights measured, which leads to minimizing the cost of the model adjustment calculations.

The device used for implementing the method comprises:

means for determining, by measurement or observation, a series of quantities representative of the stratigraphic structure of the zone at various points, and a data processing unit programmed for implementation of a direct initial model depending on a set of parameters representative of a geologic formation process of the zone, this processing unit including:

means for determining, by means of the initial model, values taken by the quantities at the various measurement or observation points, means for calculating, from the direct model, gradients of each quantity in relation to the parameters to be adjusted, means for optimizing the model by minimizing, by successive iterations, a criterion function depending on said parameters, until a sufficient difference reduction is obtained, by calculating the sensitivity of the direct model to the parameters to be adjusted, and means for producing a stratigraphic representation of the underground zone.

BRIEF DESCRIPTION OF THE DRAWINGS

Other features and advantages of the method according to the invention will be clear from reading the description hereafter of a non limitative example, with reference to the accompanying drawings wherein:

FIG. 4 shows a gradient calculation algorithm, FIG. 5 shows an algorithm for calculating optimum parameters, FIG. 6 shows a preferred algorithm used for minimizing a criterion function, FIGS. 8A, 8B show two examples of spatial variation of the height of sediments respectively at two successive times;

FIG. 8C shows the variation of the criterion function J in relation to the diffusion coefficient K, FIG. 10 is a comparative table of the optimum values reached by parameters $q^{final}$, $K_1^{final}$, $K_2^{final}$ with reference to a first set of values of the initial parameters, with $K_2=1$, FIG. 11 is a comparative table of the optimum values reached by parameters $q_{final}$, $K_1^{final}$, $K_2^{final}$ with reference to a second set of values of the initial parameters, with $K_3$ ($K_{bathy}$)=1, and FIG. 12 is a comparative table of the optimum values reached by parameters $q^{final}$, $K_1^{final}$, $K_2^{final}$ with reference to a third set of values of the intial parameters, with $K_3(K_{bathy})=1$.

DESCRIPTION OF THE METHOD

Figure 2:
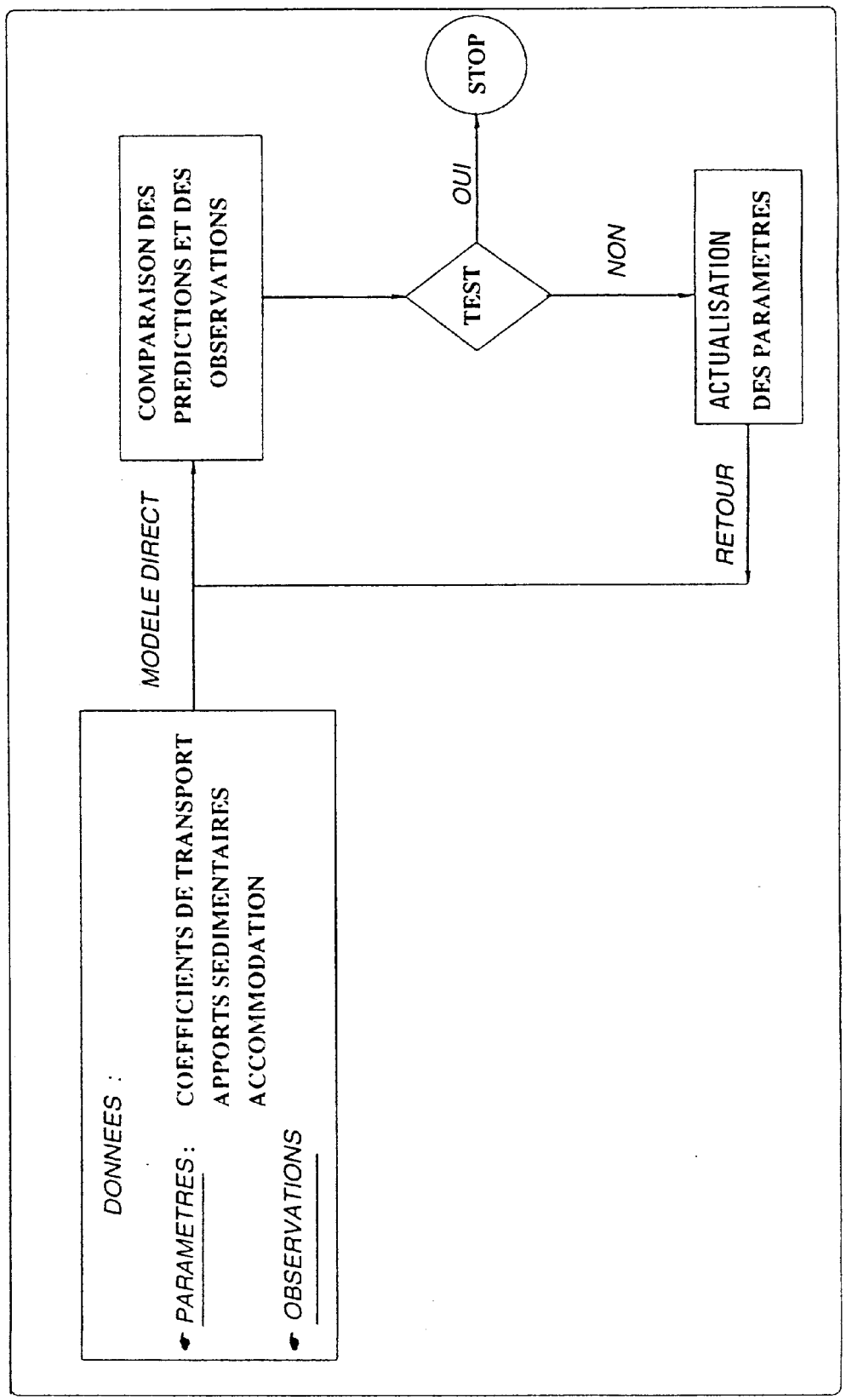
FIG. 2 shows a flow chart representative of the optimization process of a stratigraphic model.

In the broad lines schematized in FIG. 2 and developed in the description hereafter, the method comprising the following succession of stages:

Selecting a direct (for example diffusive type) model in order to simulate the real geologic object, Selecting an initial set of parameters that will allow, with the direct model, to lead to the quantities (such as the sedimentary heights for example) that describably are to coincide with the real quantities, Calculating, by means of the direct model, the quantities (sedimentary heights for example) resulting therefrom at the measurement and observation points (such as the wells drilled through the environment) and comparing them with real observations at the same points, Calculating, by means of the direct model, gradients of each quantity in relation to the parameters to be adjusted, either analytic type gradients if the direct model is derivable, or finite-difference type gradients by varying the parameters.

If the differences between the model and the observations are great, the model thus created is to be optimized by minimizing iteratively the criterion function, preferably by a quasi-Newtonian algorithm, preferably via a known optimization method referred to as BFGS.

The terms in which the optimization problem is stated will be defined hereafter by using the following notation:

$h^{ob}$ designates the observed height, $P=\{p=(p_i)_{i \geq 0} \in IR^m\}$ the set of parameters P to be identified, and m the number of parameters to be adjusted.

The set $P_{ad}$ of allowable parameters ($P_{ad} \subset P$) is defined by the set of parameters that are under constraint. If p is the parameter to be identified, the solution to the direct problem is denoted by h(. ;p). J(p), which represents the difference between the calculated quantities h(. ;p) and the observed quantities $h^{obs}$, is referred to as the objective or criterion function.

In this context, $p \epsilon P_{ad}$ has to be found such that: $J(p) \leq J(p)$ $\forall p \epsilon P_{ad}$ or in an equivalent form, $p \epsilon P_{ad}$ has to be found such that: $J(p)=Min_{p \epsilon Pad}J(p)$. In the case of the least-squares method, J(p) is written as follows:

$J(p) = \|h(. ;p) - h^{ob}\|_2$ where $\|.\|_2$ designates the norm in $L^2(\Omega)$ that represents all of the functions with summable squares. For a given function f in $L^2(\Omega)$, $\|f\|_2 = (f_\Omega |f|^2)^1)$.

Parameter p must verify $\nabla J(p)=0$. The inverse problem is a minimization problem in relation to the parameters. According to the definition of the set of allowable parameters (equal or included in the space of the unknown parameters), the problem to be dealt with is a minimization problem with or without constraints.

In the case where K(h)=cte, $\forall h$ and if K is the only parameter to be identified, estimation of the optimum K involves calculation of $\nabla h(. ;K)$, gradient of h in relation to K, given that $\nabla J = 2 \nabla h(. ;K).(h(;.K)-h^{ob})$, and the parameter K that verifies $\nabla J(K)=0$ has to be found by means of the optimization techniques.

Figure 1:
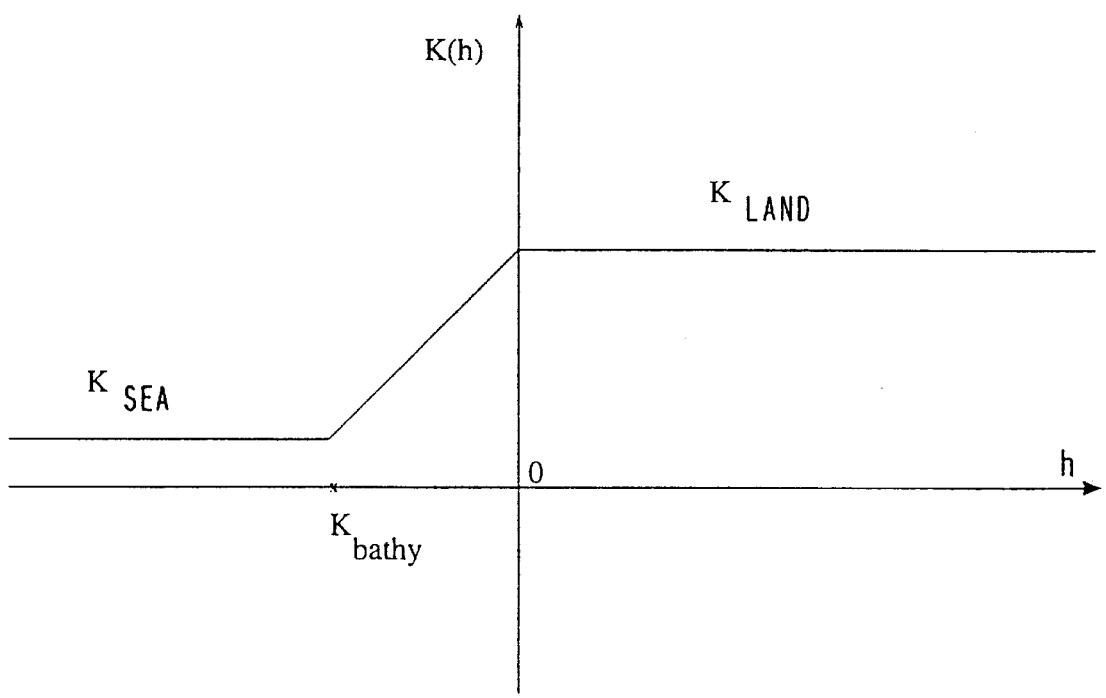
FIG. 1 shows an example of variation of the diffusion coefficient in a coastline.

In the case where function K is given as a function of $K_{land}$, $K_{sea}$ and $K_{bathy}$ of FIG. 1, the gradients of h in relation to $K_{land}$, $K_{sea}$ and $K_{bathy}$ have to be calculated and the optimum values $K_{land}$, $K_{sea}$ and $K_{bathy}$ have to be defined by means of an optimization process.

With the method according to the invention, the parameters are updated by calculating the gradient and several different calculation techniques can be used therefore.

Gradient method for the stratigraphic simulator

Case of a homogeneous layer

Figure 3:
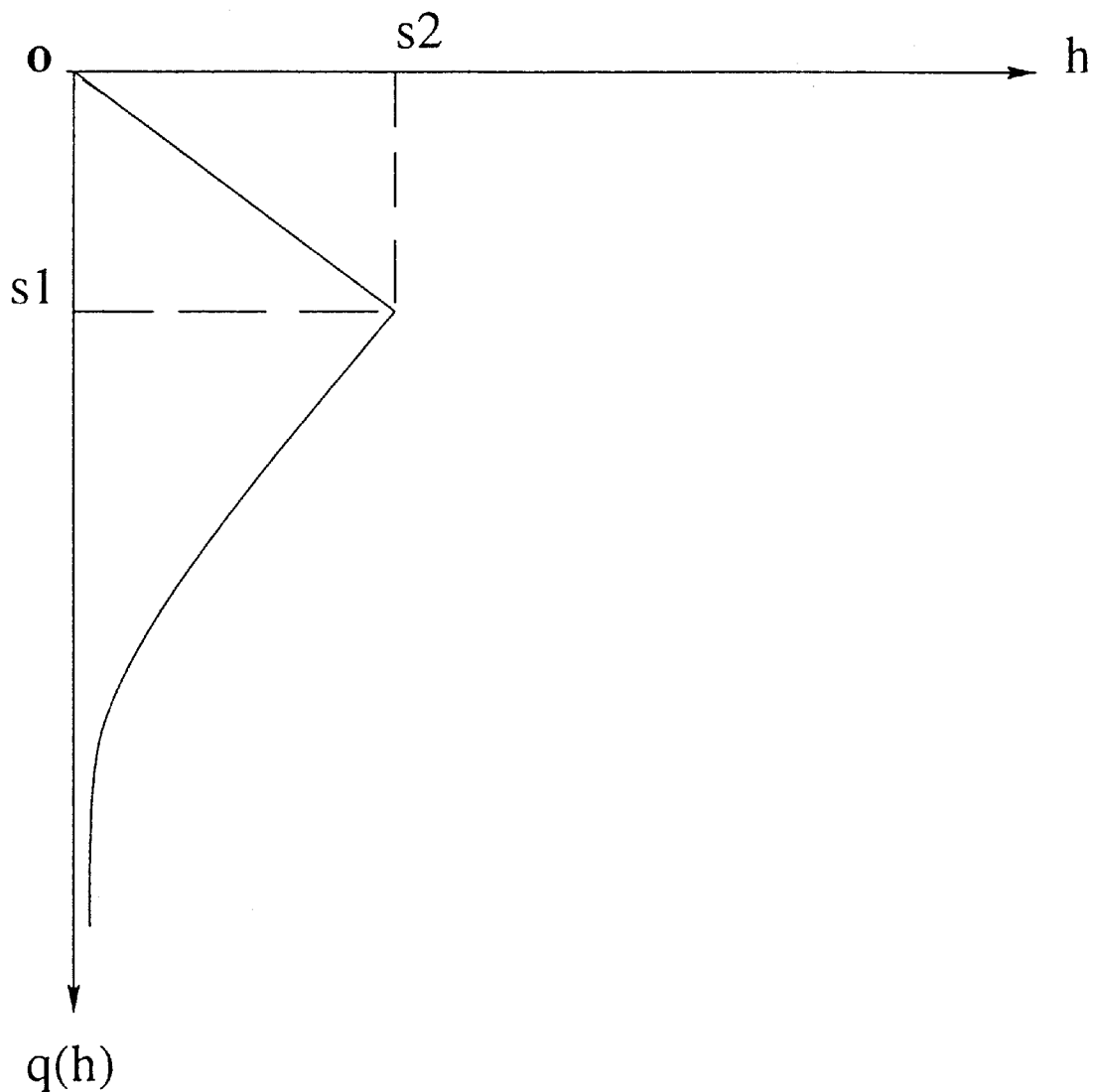
FIG. 3 shows, as a function of h, the variation of a source term representing for example the sedimentary supplies.

Parameter K(h) is here independent of the height of the basin (either above or below the water level) and the porosity $\Phi_0$ is considered to be independent of time. If we put:

$$q = \frac{g_1}{\Phi_1}, K = \frac{K_1}{\Phi_1}$$

the equation to be solved is of the following type:

$$\frac{\partial h}{\partial t} - div(KE_{water} \vec{\nabla} h) = q(h) \quad (5)$$

which is reduced to:

$$\frac{\partial h}{\partial t} - \frac{\partial}{\partial x}\left(K(h)\frac{\partial h}{\partial x}\right) = q \quad (6)$$

in the case of a one-dimensional layer and it is solved by means of a numerical solution code of a well-known type referred to as <<diffusion-code>>. The source term q can correspond to the production of carbonates or of siliciclastic sediments. A possible graphic representation is shown in FIG. 3.

Direct model derivation method

According to all that has been written before, solution of the inversion problem connected with this equation first requires estimation of $\nabla h_p$, which represents the gradient of h in relation to p, where p is the parameter to be identified.

Restriction to the one-dimensional case:

The equation satisfied by gradient $\nabla h_p$ is, as shown, of the same type as that of the direct model.

In the case where q(h)=function (h, $s_1$, $s_2$), $s_1$, $s_2 \epsilon$IR (see FIG. 3), $$\frac{\partial h}{\partial s_1} \text{ and } \frac{\partial h}{\partial s_2}$$

have to be estimated and the minimum of J(K, $s_1$, $s_2$) then has to be sought.

The algorithm that summarizes all that has been said above is schematized in FIG. 4.

General formulation of the derivation method for gradient calculation

Let U be the set of unknowns and d the set of parameters of a direct model. The approximate solution at the time $t^{n+1}$ is denoted by $U^{n+1}$. The problem (P) can be expressed, after discretization, as follows $$f(U^{n+1}, U^n, d) = 0 \quad (8)$$

and solved by means of a conventional Newton type method. The gradient method for parameters inversion consists in deriving Eq. (8) in relation to parameter d; in this case, $$Y^{n+1} = \frac{\partial U^{n+1}}{\partial d}$$

is solution to the linear system as follows:

$$\frac{\partial f}{\partial U^{n+1}} \cdot Y^{n+1} = -\left(\frac{\partial f}{\partial d} - \frac{\partial f}{\partial U^n} \cdot Y^n\right) \quad (9)$$

An application of this method is for example described by:

Rahon D. et al. : <<Gradient Method Constrained Geological Bodies for History Matching>>. SPE 36568 : Society of Petroleum Engineers, 1996.

Numerical gradient calculation methods

A first method derives the discretized equations of the direct model, and for example Eq. (5) in the case of a single lithology.

A second possibility uses a finite-difference method in order to approximate to the gradient $\nabla_{p_i} h(p)$ by $$\frac{\tilde{h} - h}{\delta_i} \text{ or } \tilde{h} = h(.; p + \Delta_{ip}),$$

the perturbation $\nabla_{ip}$ is obtained by perturbing the i-th element of vector p:

$$\Delta_{ip} = (p_0, p_1, \ldots, p_i \alpha \delta_i, \ldots).$$

A first simulation is performed with parameter p and h is obtained, then a new simulation is performed with parameter $(p_0, p_1, \ldots, p_i + \delta_i, \ldots)$ in order to evaluate $h(. ; p + \Delta_{ip})$.

Optimization methods

There are well-known methods for optimizing an iterative function based on the search for a stationary point, i.e. the point that equates the gradient of the function to zero and, among them, in particular the method referred to as the conjugate gradient method for quadratic functions and the BFGS method for any function.

The BFGS method, which is not sensitive to inaccuracies in the one-dimensional search procedure, is preferably selected. This allows using economical one-dimensional optimization methods that require only a very small number of function evaluations on each iteration.

For the BFGS method, the hessian $H_k$ approximations are defined by $H_0=I$ (I is the identity matrix) and by the following recurring sequence:

$$H_{k+1} = H_k + \left[1 + \frac{\gamma_k^\perp H_k \gamma_k}{\delta_k^\perp \gamma k}\right] \cdot \frac{\delta_k \cdot \delta_k^\perp}{\delta_k^\perp \cdot \gamma_k} - \frac{\delta_{k_{\lambda_k^\perp}} H_k + H_k \gamma_k \delta_k^\perp}{\delta_k^\perp \cdot \gamma k} \quad (20)$$

where $\delta_k = p^{k+1} - p^k$ and $\gamma_k = \nabla J(p^{k+1}) - \nabla J(p^k)$.

$x^\perp$ designates the transpose of vector x (line matrix) and $x^\perp.y$ designates the scalar product of vectors x and y.

The criterion minimization BFGS algorithm is schematized in FIG. 6.

Application of the inversion algorithm

The BFGS algorithm described above is used to define an inverse model for identification of the parameters involved in the following direct model whose mathematical formulation is expressed, for i=1, ... ,N, as follows:

$$\begin{cases} \frac{\partial}{\partial t}(v_i \Phi_i h) + div\left(-K_i v_i E_{water}^i \vec{\nabla} h\right) = g_i \text{ on } \Omega \times [0, T[ \\ \sum_{i=1}^{N} v_i = 1 \\ h = h_0 \text{ on } \Gamma_1 \times [0, T[ \\ v_i E_{water}^i K_i \vec{\nabla} h \cdot \vec{n} = f_i \text{ on } \Gamma_2 \times [0, T[ \\ h(x, y, 0) = g(x, y) \text{ on } \Omega \end{cases}$$

where $\Omega$ represents the sedimentary basin, N the number of lithologies and $K_i$ the diffusivities that can be constant or dependent on h as in FIG. 1 of section 1.

In this case, the set P of the parameters that are to be adjusted contains the diffusion coefficients $K_{1,i}$, $K_{3,i}$ and $K_{2,i}$ (respectively on land, bathymetry and at sea) for each lithology i, the source terms $g_i$ and the flows $f_i$ at the border $\Gamma_2$. Two cases are considered:

1) If $\forall i$, $g_i$ is constant regardless of h, then:
P={
$K_{1,1}$, $K_{3,1}$, $K_{2,1}$; ... ; $K_{1,N}$, $K_{3,N}$, $K_{2,N}$;
$g_1$, ... , $g_N$;
$f_1$, ... ,$f_N$
}.

2) If the functions $g_i$=function(h, $s_{1,i}$, $s_{2,i}$) are given by the law of FIG. 3, i.e. if the $g_i$ are defined via coefficients $s_{1,i}$, $s_{2,i}$, then:
P={
$K_{1,1}$, $K_{3,1}$, $K_{2,1}$; ... , $K_{1,N}$, $K_{3,N}$, $K_{2,N}$;
$s_{1,1}$, ... ,$s_{1,N}$;$s_{2,1}$, ... ,$s_{2,N}$;
$f_1$, ... ,$f_N$
}.

Flow chart of the inverse model

Figure 7:
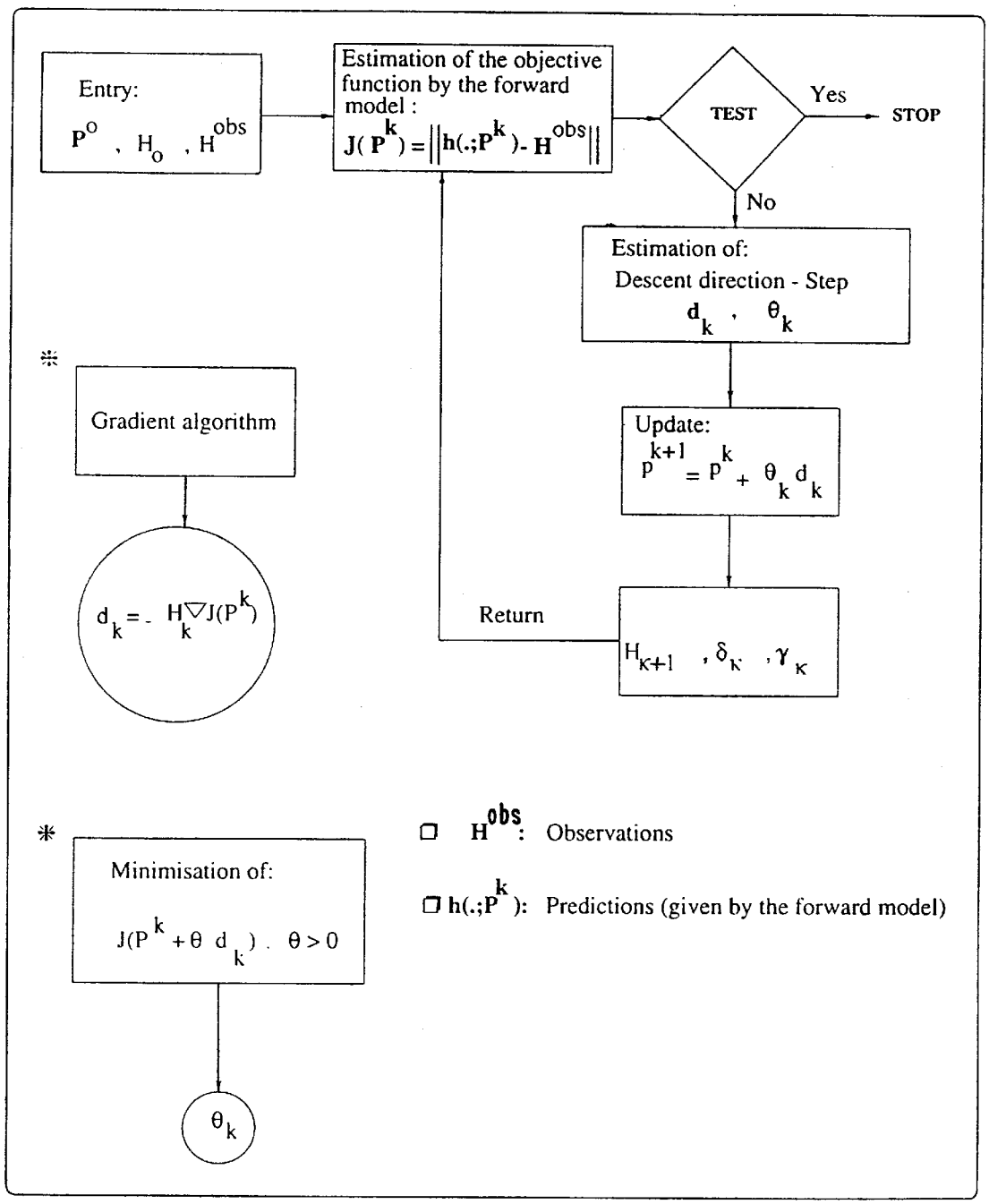
FIG. 7 shows a flow chart of the inversion process used for optimizing the stratigraphic model.

The parameters to be identified being fixed, the procedure to be followed is summarized in the flow chart of FIG. 7.

Numerical tests

Inversion of the parameters of the diffusive model is described hereafter in the monolithologic case (N=1) under Neumann and Dirichlet type boundary conditions by means of the partial differential equation:

$$(E) \frac{\partial h}{\partial t} - div\left(KE_{water} \vec{\nabla} h\right) = q,$$

Inversion in the linear case

Inversion of the diffusion coefficient K(h)=cte, $\forall h$ has been performed on a test basis by trying to adjust the numerical model to another numerical model (playing the part of the real model) so that:

$h^{obs}(.,.)=h(.,. ;K_{optimun})$, $K_{optimum}=12$ where $h(.,. ;K_{optimum})$ is the solution to Eq. (E).

Figure 9B:
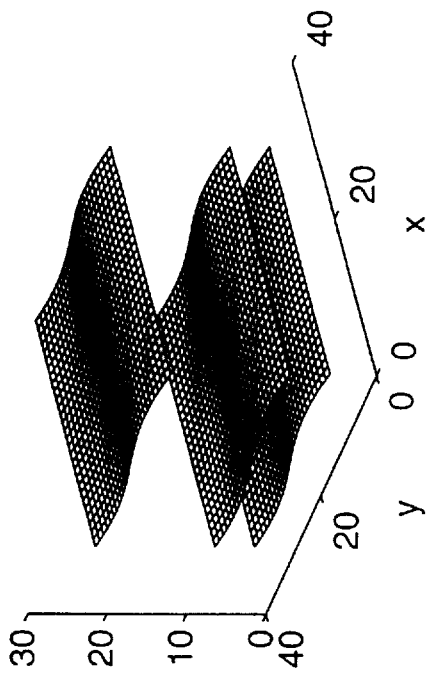
FIGS. 9A, 9B show examples of spatial variation of the height of sediments h, the first one at an initial time, the second at three successive times $t_0$, $t_1$ and $t_2$.
Figure 9A:
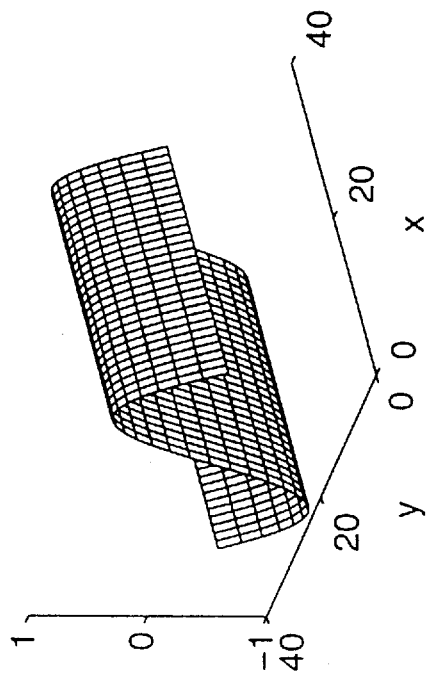
Figure 9C:
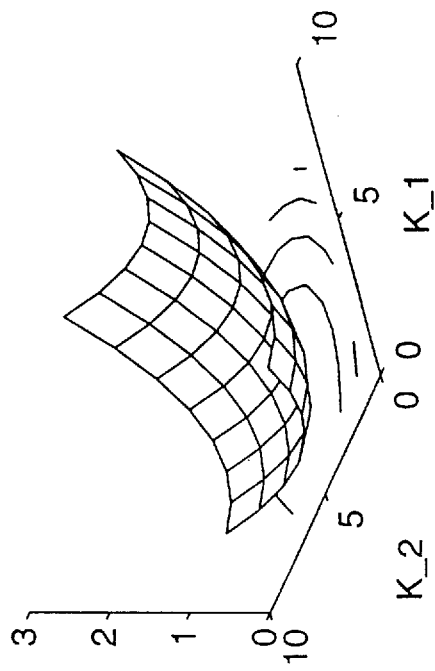
FIG. 9C shows an example of variation as a function of the diffusivity coefficients K1 ($K_{land}$) and K2 ($K^{sea}$) of criterion function J.

Criterion J(K) is finally minimized and $K^0=4$ is selected as the starting. point of the BFGS method. One checks that the optimum coefficient found coincides exactly with $K_{optimum}$. This is illustrated in FIGS. 9A to 9C where the third representation corresponds to criterion J as a function of K. Convergence to the minimum is obtained here after only three iterations. It can be observed that the same result is obtained when the criterion is evaluated on all the points of the space or on some of them only, i.e. observations $h^{obs}$ are known only in some wells.

Inversion in the non linear case

This part deals with the numerical study of Eq. (E) in the case where K(h) is defined as a function of the three parameters $K_1$, $K_3$ and $K_2$ (see FIG. 1). $K_3$ is fixed and parameters q, $K_1$ and $K_2$ are inverted. FIGS. 9A, 9B correspond to the representation of some direct simulations and of criterion $J(K_1, K_2)$ where $K_3=0.1$ and q=5.

The initial diffusion coefficient K(h) is shown in FIG. 9C.

The tables of FIGS. 10 and 11 correspond to the inversion of parameter p=(q, $K_1$, $K_2$) with observations calculated by means of parameter $p_{optimum}$=(10, 5, 2.5).

The table of FIG. 12 corresponds to the inversion of parameter p=(q, $K_1$, $K_2$) with observations calculated by means of parameter $p_{optimum}$=(10, 5, 3).

Criterion $J(K_1, K_2)$ which corresponds to this case is shown in FIG. 9C. It can be noted that calculation of the minimum J depends on the initial values $q^0$, $K_1^0$ and $K_2^0$.

One checks on the tables of FIGS. 10 and 12 that the convergence to $p_{optimum}$ is ensured despite the distance between the starting points and $p_{optimum}$, and therefore the convergence to the optimum is ensured for all the cases presented, despite the different starting points that are selected very far from the optimum.

Examples of implementation of the method have been described where the quantity considered was a height (thickness) of sedimentary deposits. However, without departing from the scope of the invention, other quantities can be considered, such as data resulting from well test interpretations (pressure values) or geologic data (position and nature of lithologies) obtained by interpretation of seismic measurements for example.

What is claimed is:

1. A method of automatic modeling of a stratigraphic structure of an underground zone with fast automatic adjustment of parameters of a model with observed or measured lithologic data, comprising:

determining, by measurement or observation, a series of quantities representative of a stratigraphic structure of the underground zone at different points;

implementing a direct initial model depending on a set of parameters representative of a geologic formation process of the underground zone;

determining from of the direct initial model, values of the quantities at measurement or observation points;

calculating with the direct model, the gradients of the quantities in relation to the parameters to be automatically adjusted; and optimizing the direct model by minimizing, by successive iterations, a criterion function until sufficient reduction of differences is reached between the parameters of the direct model with the observed or measured lithologic data, by calculating a sensitivity of the direct model to the parameters to be automatically adjusted, to produce a stratigraphic representation of the underground zone.

2. A method as claimed in claim 1, comprising:
using a diffusive type direct model.

3. A method as claimed in claim 1, comprising:
using a selected direct model derivable in relation to the parameters and using analytic type gradients.

4. A method as claimed in claim 2, comprising:
using a selected direct model derivable in relation to the parameters and using analytic type gradients.

5. A method as claimed in claim 1, comprising:
using finite-difference gradients.

6. A method as claimed in claim 2, comprising:
using finite-difference gradients.

7. A method as claimed in claim 1, comprising:
using a quasi-Newtonian algorithm to minimize the criterion function.

8. A method as claimed in claim 2, comprising:
using a quasi-Newtonian algorithm to minimize the criterion function.

9. A method as claimed in claim 3, comprising:
using a quasi-Newtonian algorithm to minimize the criterion function.

10. A method as claimed in claim 4, comprising:
using a quasi-Newtonian algorithm to minimize the criterion function.

11. A method as claimed in claim 5, comprising:
using a quasi-Newtonian algorithm to minimize the criterion function.

12. A method as claimed in claim 6, comprising:
using a quasi-Newtonian algorithm to minimize the criterion function.

13. A device which automatically models a stratigraphic structure of an underground zone with fast automatic adjustment of parameters of a model with observed or measured lithologic data, comprising:

means for determining, by measurement or observation, a series of quantities representative of the stratigraphic structure of the underground zone at various points; and a programmed data processing unit which implements a direct initial model depending on a set of parameters representative of a geologic formation process of the zone, the processing unit including means for determining, by means of the initial model, values of the quantities at measurement or observation points, means for calculating, from the direct model, gradients of the quantities in relation to the parameters to be automatically adjusted, means for optimizing the direct model by minimizing, by successive iterations, a criterion function until sufficient reduction of differences is reached between the parameters of the direct model with the observed or measured lithographic data, by calculating a sensitivity of the direct model to the parameters to be automatically adjusted, and means for producing a stratigraphic representation of the underground zone.

* * * * *